United States Patent
Xu (10) Patent No.: US 12,538,075 B2
(45) Date of Patent: Jan. 27, 2026

(54) WIRELESS MULTI-CHANNEL AUDIO TRANSMISSION METHOD AND DEVICE

(71) Applicant: Zgmicro Hefei Co., Ltd., Anhui (CN)

(72) Inventor: Bin Xu, Hefei (CN)

(73) Assignee: Zgmicro Hefei Co., Ltd., Hefei (CN)

( * ) Notice: Subject to any disclaimer, the term of this patent is extended or adjusted under 35 U.S.C. 154(b) by 693 days.

(21) Appl. No.: 17/947,123

(22) Filed: Sep. 18, 2022

(65) Prior Publication Data

US 2023/0092469 A1    Mar. 23, 2023

(51) Int. Cl.
  *H04R 5/04*   (2006.01)
  *H04H 20/89*  (2008.01)
  *H04J 3/02*   (2006.01)

(52) U.S. Cl.
  CPC .............. *H04R 5/04* (2013.01); *H04H 20/89* (2013.01); *H04J 3/02* (2013.01); *H04R 2420/07* (2013.01)

(58) Field of Classification Search
  CPC ...... H04R 5/04; H04R 2420/07; H04H 20/89; H04J 3/02; H04W 72/0453; Y02D 30/70
  USPC ........................................................ 455/3.06
  See application file for complete search history.

(56) References Cited

U.S. PATENT DOCUMENTS

| | | | |
|---|---|---|---|
| 7,653,344 B1 | 1/2010 | Feldman et al. | |
| 2005/0085197 A1* | 4/2005 | Laroia ................. | H04B 7/0691 455/562.1 |
| 2013/0273851 A1* | 10/2013 | Preiszler ................. | H04W 4/80 455/41.2 |
| 2017/0230777 A1* | 8/2017 | Seldess ................... | H04S 7/304 |

FOREIGN PATENT DOCUMENTS

| | | |
|---|---|---|
| CN | 1886996 A | 12/2006 |
| CN | 108810860 A | 11/2018 |
| CN | 111464988 A | 7/2020 |
| CN | 113223539 A | 8/2021 |

(Continued)

OTHER PUBLICATIONS

First Office Action and search report received for Chinese Application No. 202111098470.2, dated Jan. 18, 2024.

(Continued)

*Primary Examiner* — Eugene Yun
(74) *Attorney, Agent, or Firm* — Zhong Law, LLC (57) ABSTRACT

A wireless multi-channel audio transmission method and a wireless multi-channel audio transmission device are disclosed in the present invention. The wireless multi-channel audio transmission method comprises: dividing the N channels of audio data into M groups of subset channel audio data, wherein each group of subset channel audio data comprises at least one channel of audio data; and transmitting the M groups of subset channel audio data to the M subset channel audio receiving devices through M transmission modules in parallel, wherein each of the transmission modules adopts a different transmitting frequency at the same time, and the transmission modules used for transmitting each group of subset channel audio data are changed according to a preset changing rule. Thus, frequency division multiplexing and spatial diversity are used to improve transmission bandwidth, reduce transmission delay and increase transmission reliability of wireless multi-channel audio transmission.

14 Claims, 4 Drawing Sheets

(56) References Cited

FOREIGN PATENT DOCUMENTS

| EP | 0847157 A2 | 6/1998 |
|----|------------|--------|
| JP | 2004343569 A | 12/2004 |
| JP | 2013031059 A | 2/2013 |
| WO | 2021112646 A1 | 8/2006 |
| WO | 2019066520 A2 | 4/2019 |

OTHER PUBLICATIONS

Second Office Action and search report received for Chinese Application No. 202111098470.2, dated Jun. 5, 2024.

* cited by examiner

301 — M groups of subset channel audio data transmitted by a wireless multi-channel audio transmission device in parallel are received, wherein the M groups of subset channel audio data comprises N channels of audio data, and each group subset channel audio data comprises at least one channel of audio data;
each group of subset channel audio data transmitted from changed transmission modules is received by a corresponding subset channel audio receiving device when the wireless multi-channel audio transmission device changes the transmission modules used for transmitting each group of subset channel audio data according to a preset changing rule

WIRELESS MULTI-CHANNEL AUDIO TRANSMISSION METHOD AND DEVICE

BACKGROUND OF THE INVENTION

Field of the Invention

The present invention relates to the field of wireless audio transmission, and in particular, to a wireless multi-channel audio transmission device and the method for the same.

Description of the Related Art

Wireless audio technology allows people to have calls and music enjoyment anywhere. In particular, Bluetooth Low Energy (BLE) audio technology can provide wireless multi-channel audio services with lower power consumption, lower cost and higher quality. The BLE audio technology is based on a Connected Isochronous Stream (CIS) protocol of point-to-point communication, a Broadcast Isochronous Stream (BIS) protocol of point-to-multipoint communication, and a Connected Isochronous Group (CIG) protocol composed of at least one CIS and a Broadcast Isochronous Group (BIG) protocol composed of at least one BIS. For example, two-channel True Wireless Stereo (TWS) earphones based on two-channel CIS or BIS have been widely used.

A maximum transmission rate of physical layer of the Bluetooth low energy audio is, however, only 2 Mbps. The rate limits further improvement of wireless multi-channel audio quality, especially, a reliable transmission of wireless high-resolution multi-channel audio. It also limits a further reduction of wireless multi-channel audio delay, especially, affecting the performance of wireless multi-channel gaming earphones that require ultra-low latency. Moreover, it limits a further increase in the number of channels of the wireless multi-channel audio. In particular, it affects the performance of wireless 5.1 or 7.1 multi-channel surround sound speakers with high quality and low delay.

Generally, the transmission rate of the BLE audio is improved by reducing a symbol period of GFSK modulation used by the BLE audio, using a differential phase shift keying modulation with the same symbol period, or using multicarrier modulation technology, or transmitting multi-channel audio by using a plurality of BLE radio frequency transmitters with the same number of channels. However, these traditional methods all have some defects in one way or another. For example, the shorter the symbol period is, the greater the influence of multipath interference is, and the worse the performance of long-distance wireless transmission is. For another example, a power is difficult to meet requirements of low power consumption. For still another example, a switching time ratio increases with an increase of the transmission rate and the number of transmission channels during time-division multiplexing, resulting in a decrease in link efficiency. For another example, as the number of channels increases, the complexity increases, resulting in a decrease in flexibility and reliability.

Therefore, there is a need for an improved scheme to solve at least the above problems.

SUMMARY OF THE INVENTION

The present invention proposes a wireless multi-channel audio transmission method, and a wireless multi-channel audio transmission device to improve a performance of wireless multi-channel audio transmission.

To achieve the purpose, according to one aspect of the present invention, a wireless multi-channel audio transmission method is provided for transmitting N channels of audio data to M subset channel audio receiving devices. The method of the audio receiving devices comprises: dividing the N channels of audio data into M groups of subset channel audio data, wherein each group of subset channel audio data comprises at least one channel of audio data; and transmitting the M groups of subset channel audio data to the M subset channel audio receiving devices through M transmission modules in parallel, wherein each of the transmission modules adopts a different transmitting frequency at the same time, and the transmission modules used for transmitting each group of subset channel audio data are changed according to a preset changing rule. M and N are positive integers, and M≥2, N≥2.

According another aspect of the present invention, a wireless multi-channel audio transmission method is provided. The wireless multi-channel audio transmission method comprises: receiving M groups of subset channel audio data transmitted by a wireless multi-channel audio transmission device in parallel, wherein the M groups of subset channel audio data comprises N channels of audio data, and each group of subset channel audio data comprises at least one channel of audio data, and M and N are positive integers, and M≥2, N≥2; and receiving each group of subset channel audio data transmitted from changed transmission modules by a corresponding subset channel audio receiving device when the wireless multi-channel audio transmission device changes the transmission modules used for transmitting each group of subset channel audio data according to a preset changing rule.

According another aspect of the present invention, a wireless multi-channel audio transmission device is provided. The wireless multi-channel audio transmission device for transmitting N channels of audio data to M subset channel audio receiving devices, comprises: an audio processing and storage unit configured for dividing the N channels of audio data into M groups of subset channel audio data, wherein each group of subset channel audio data comprises at least one channel of audio data; and a baseband and protocol processing unit configured for transmitting the M groups of subset channel audio data to the M subset channel audio receiving devices through M transmission modules in parallel, wherein each of the transmission modules adopts a different transmitting frequency at the same time, and the transmission modules used for transmitting each group of subset channel audio data are changed according to a preset changing rule, wherein M and N are positive integers, and M≥2, N≥2.

In the wireless multi-channel audio transmission scheme of the present invention, a plurality of frequency channels are used to transmit subset channel audio data in parallel, and frequency division multiplexing and spatial diversity are used to improve the transmission bandwidth, reduce transmission delay and increase transmission reliability of the wireless multi-channel audio transmission system.

There are many other objects, together with the foregoing attained in the exercise of the invention in the following description and resulting in the embodiment illustrated in the accompanying drawings.

BRIEF DESCRIPTION OF THE DRAWINGS

These and other features, aspects, and advantages of the present invention will become better understood with regard to the following description, appended claims, and accompanying drawings wherein:

DETAILED DESCRIPTION OF THE PREFERRED EMBODIMENTS

The detailed description of the invention is presented largely in terms of procedures, operations, logic blocks, processing, and other symbolic representations that directly or indirectly resemble the operations of data processing devices that may or may not be coupled to networks. These process descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be comprised in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

A wireless multi-channel audio transmission method, according to one embodiment of the present invention, is described in detail below with reference to accompanying drawings through specific embodiments and application scenarios thereof.

Figure 1:
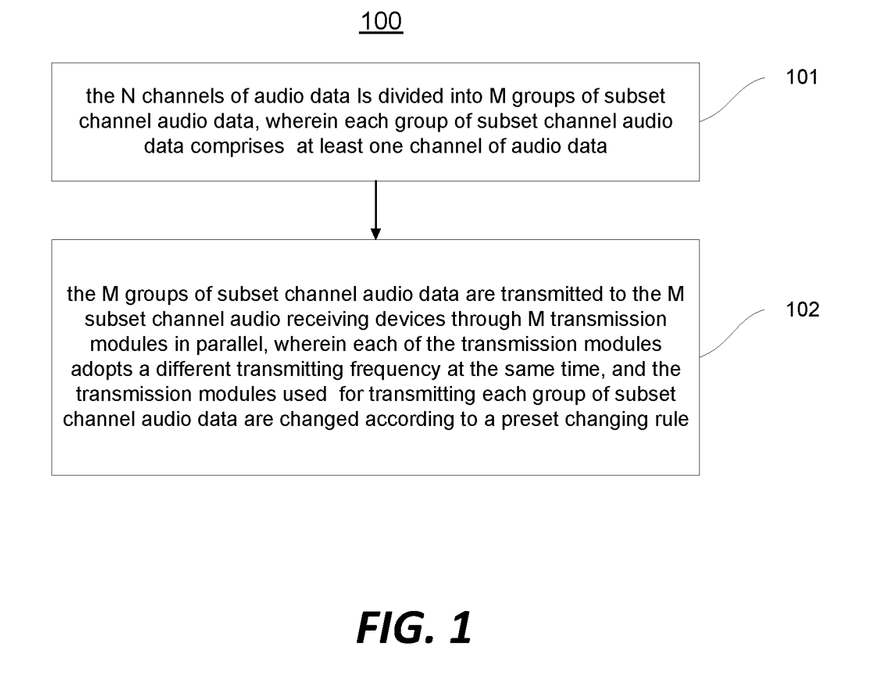
FIG. 1 is a flowchart of a wireless multi-channel audio transmission method according to one embodiment of the present invention.

FIG. 1 is a flowchart of a wireless multi-channel audio transmission method according to one embodiment of the present invention. The wireless multi-channel audio transmission method 100 is configured for transmitting N channels of audio data to M subset channel audio receiving devices, wherein M and N are both positive integers, and M≥2, N≥2. The wireless multi-channel audio transmission method 100 comprises following operations. At 101, the N channels of audio data is divided into M groups of subset channel audio data, wherein each group of subset channel audio data comprises at least one channel of audio data. The number of channels of each group of subset channel audio data may be the same or different. For example, the number of channels of one group of subset channel audio data is $K_m$, then $\Sigma_{m=1}^{M} K_m = N$, m∈M, M≥2.

In one embodiment, the N channels of audio data is grouped into the M groups of subset channel audio data according to channel information of the audio data received by each subset channel audio receiving device. One subset channel audio receiving device receives one corresponding group of subset channel audio data. The channel information comprises the channel information and the number of channels that the subset channel audio receiving device needs to receive.

For example, if M=2 and N=3, that is, there are 2 subset channel audio receiving devices, and there are 3 channels of audio data. A first subset channel audio receiving device can receive two channels of audio data, a second subset channel audio receiving device can only receive one channel of audio data, and then the 3 channels of audio data are divided into two groups of subset channel audio data. A first group of subset channel audio data comprises 2 channels of audio data, and corresponds to the first subset channel audio receiving device. A second group of subset channel audio data comprises one channel of audio data, and corresponds to the second subset channel audio receiving device.

At 102, the M groups of subset channel audio data are transmitted to the M subset channel audio receiving devices through M transmission modules in parallel. The transmission modules adopt different transmitting frequencies. The transmission modules used for transmitting each group of subset channel audio data are changed according to a preset changing rule.

In one embodiment, each transmission module comprises a radio frequency (RF) unit and an antenna connected with corresponding radio frequency unit. The M transmission modules use different channels to transmit the M groups of subset channel audio data in parallel, and a frequency of each channel is different at the same time. This frequency diversity method can ensure channels of the M groups of subset channel audio data do not interfere with each other. During specific implementation, various existing channel selection algorithms may be used to calculate each channel. For example, a time division multiplexed BLE channel selection algorithm may be used to calculate the channel used by each transmission module at each moment.

In one embodiment, the preset changing rule comprises: each group of subset channel audio data is transmitted through the M transmission modules alternately. For example, if there are 3 transmission modules in total, a first transmission module is used to transmit a target group of subset channel audio data at time 1, a second transmission module is used to transmit the target group of subset channel audio data at time 2, and a third transmission module is used to transmit the target group of subset channel audio data. In this way, the target group of subset channel audio data is transmitted alternately and repeatedly, so that frequency division multiplexing and space diversity can be comprehensively utilized to improve transmission bandwidth of wireless communication, reduce transmission delay, and increase transmission reliability.

Taking a BLE wireless communication as an example, each transmission module comprises a BLE radio frequency (RF) unit and an antenna. Each group of subset channel audio data corresponding to one subset channel audio receiving device is transmitted in different subevent time slots through different channels, different BLE RF units and different antennas. That is to say, the subset channel audio receiving device does not receive corresponding group of subset channel audio data from one fixed transmission module or one fixed channel. For example, when the subset channel audio receiving device 2 receives the second group of subset channel audio data, the subset channel audio receiving device 2 corresponds to the channel 1, the BLE RF unit 3 and the antenna 3 at a time 1, and the subset channel audio receiving device 2 corresponds to the channel 5, the BLE RF unit 2 and the antenna 2 at a time 2.

In one embodiment, the preset changing rule comprises: when each group of subset channel audio data is repeatedly transmitted within one transmission time period, different transmission modules are used for transmission at least one time. For example, the transmission module used in a first retransmission can be different from the transmission module used in a first transmission, so that frequency division multiplexing and space diversity can be comprehensively utilized to improve transmission bandwidth of wireless communication, reduce transmission delay, and increase transmission reliability. It can be understood that other similar changing rules can also be used based on the technical idea of the present invention.

In one embodiment, when one group of subset channel audio data comprises at least two channels of audio data, one transmission module is configured to transmit the at least two channels of audio data serially in a time division multiplexing mode. At this time, while the M groups of subset channel audio data are transmitted in parallel through the M transmission modules, the at least two channels of audio data in the group of subset channel audio data are transmitted in series through one transmission module in the time division multiplexing mode. Therefore, the present invention fully integrates characteristics of frequency division multiplexing, time division multiplexing and spatial diversity to transmit multi-channel audio data, further improves the transmission bandwidth of wireless communication, reduces transmission delay, and increases transmission reliability. The wireless multi-channel audio transmission method provided according to one embodiment of the present invention can be applied to various wireless frequency hopping communication scenarios.

In one embodiment, when the wireless multi-channel audio transmission method is applied in the Bluetooth low energy communication, the wireless multi-channel audio transmission method comprises: one group of connected isochronous stream (CIS) links is established with each subset channel audio receiving device respectively to transmit one group of subset channel audio data. The group of CIS links comprises one or more CIS link, and one CIS link is configured to transmit one channel of audio data.

In another embodiment, when the wireless multi-channel audio transmission method is applied in the Bluetooth low energy communication, the wireless multi-channel audio transmission method comprises: one group of broadcast isochronous stream (BIS) links is established with each subset channel audio receiving device respectively to transmit one group of subset channel audio data. The group of BIS links comprises one or more BIS link which is configured to transmit one channel of audio data.

When the wireless multi-channel audio transmission method is applied in the Bluetooth low energy communication, each transmission module comprises a BLE RF unit and an antenna, and the wireless multi-channel audio transmission method further comprises: the N channels of audio data is encoded, and packaged into N channels of protocol data units respectively according to the CIS protocol or the BIS protocol; and then the N channels of protocol data units is grouped into M groups of subset channel audio data according to channel information of the audio data received by each subset channel audio receiving device; and the M groups of subset channel audio data are respectively transmitted to corresponding subset channel audio receiving device through the M transmission modules in parallel.

The following takes an application scenario of Bluetooth low energy audio technology as an example to introduce. First, a data encoding and encapsulation method commonly used in the BLE Audio technology can be used to encode the N channels of audio data into N channels of mono audio data or audio service data unit (SDU) according to the BLE audio communication protocol. Then, the N channels of mono audio data or SDU are encapsulated into protocol data units (PDU) according to the CIS protocol or the BIS protocol. Subsequently, according to the channel information of the audio data received by each subset channel audio receiving device, the protocol data units of each channel are grouped to form the M groups of subset channel audio data, so as to be sent to the corresponding M subset channel audio receiving devices in parallel through the M transmission modules. For example, the BLE RF unit modulates the input PDUs into a radio frequency signal and the antenna sends the radio frequency signal to corresponding subset channel audio receiving device.

In one embodiment, each group of subset channel audio data are transmitted through the M transmission modules alternately. Specifically, for one channel of protocol data units transmitted through the CIS link or the BIS link with a sequence number X, the BLE RF unit and the antenna with a sequence number R is used in a subevent with a sequence number S of an isochronous channel event with a sequence number E, wherein R=(X+E+S) mod M, R, X, E and S are all natural numbers. Better communication performance can be obtained by alternately changing the transmission modules.

Through the above wireless multi-channel audio transmission method, the multi-channel audio data can be divided into at least two groups of subset channel audio data, and the multiple transmission modules are used to transmit the subset channel audio data in parallel through multiple frequency channels and multiple antennas. In this way, the frequency division multiplexing, the time division multiplexing and the spatial diversity are used to transmit multi-channel audio data, so as to improve the transmission bandwidth of wireless communication, reduce transmission delay, and increase transmission reliability.

Figure 3:
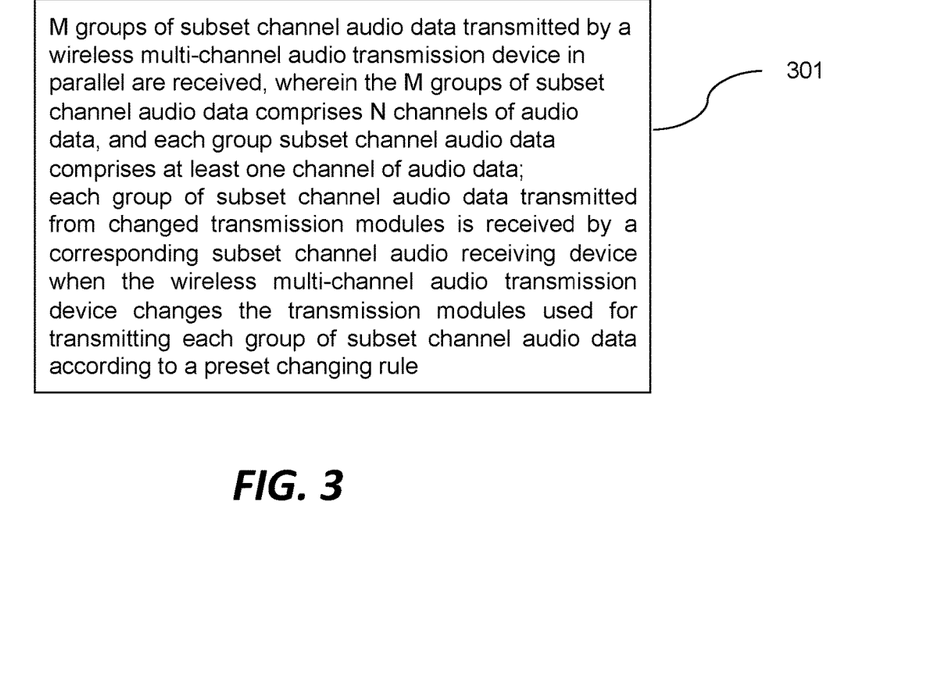
FIG. 3 is a flowchart of a wireless multi-channel audio transmission method according to another embodiment of the present invention.

According to an aspect of the present invention, the present invention also provides a wireless multi-channel audio transmission method. The wireless multi-channel audio transmission method comprises the following operations. At 301, M groups of subset channel audio data sent by a wireless multi-channel audio transmission device in parallel are received. The M groups of subset channel audio data comprises N channels of audio data, and each group subset channel audio data comprises at least one channel of audio data. Each group of subset channel audio data transmitted from changed transmission modules is received by a corresponding subset channel audio receiving device when the wireless multi-channel audio transmission device changes the transmission modules used for transmitting each group of subset channel audio data according to a preset changing rule, wherein M≥2, N≥2, both M and N are positive integers. For example, N=5, M=3, $K_m$ is the number of channels of the group m of subset channel audio data, $K_1=1$, $K_2=2$, $K_3=2$, that is, the 3 subset channel audio receiving devices receives 1, 2, and 2 channels of audio data are respectively. It can also be $K_1=1$, $K_2=1$, $K_3=3$, that is, the 3 subset channel audio receiving devices receive 1, 1, and 3 channels of audio data respectively.

In one embodiment, the subset channel audio receiving devices comprise at least one mono audio receiving device, and/or at least one multi-channel audio receiving device. Specifically, each subset channel audio receiving device may comprise one mono channel audio receiving device, may also comprise one multi-channel audio receiving device, and may also comprise a plurality of mono audio receiving devices and/or a plurality of multi-channel audio receiving devices. The wireless multi-channel audio transmission method further comprises: each subset channel audio receiving device establishes a group of CIS links, or a group of BIS links with the wireless multi-channel audio transmission device.

Through the above wireless multi-channel audio transmission method, each subset channel audio receiving device can receive one group of subset channel audio data from the wireless multi-channel audio transmission device. The communication process has characteristics of wide transmission bandwidth, low transmission delay and strong transmission reliability.

Figure 4:
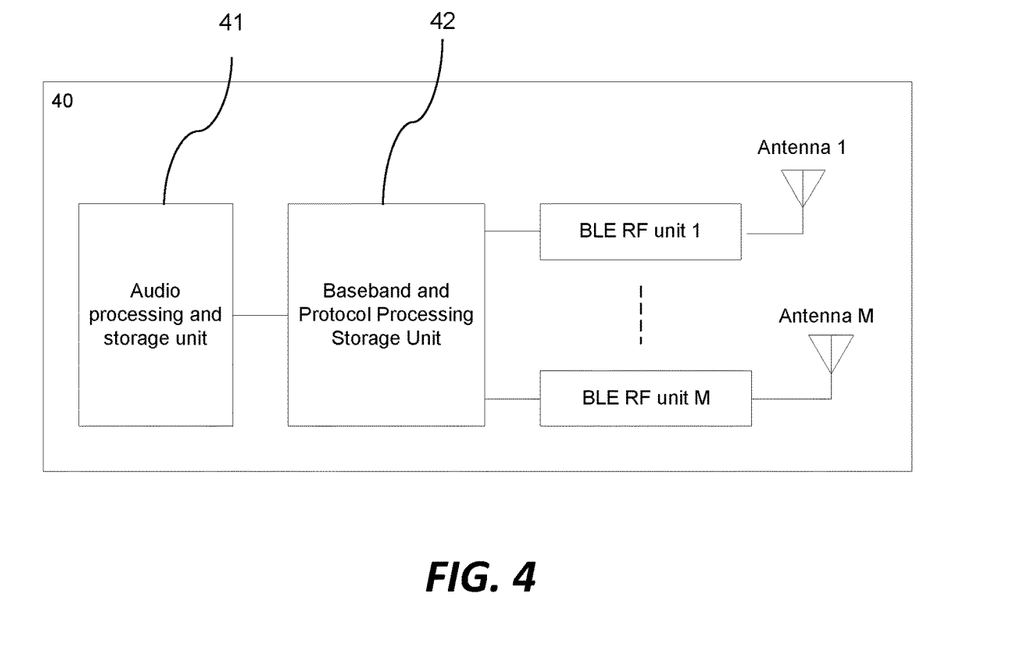
FIG. 4 is a schematic block diagram of a wireless multi-channel audio transmission device according to one embodiment of the present invention.

FIG. 4 is a schematic block diagram of a wireless multi-channel audio transmission device 40 according to one embodiment of the present invention. Referring to FIG. 4, the wireless multi-channel audio transmission device 40 is configured for transmitting N channels of audio data to M subset channel audio receiving devices. The wireless multi-channel audio transmission device 40 comprises an audio processing and storage unit 41, a baseband and protocol processing unit 42 and M transmission modules.

The audio processing and storage unit 41 is configured to divide the N channels of audio data into M groups of subset channel audio data. Each group of subset channel audio data comprises at least one channel of audio data. The baseband and protocol processing unit 42 is configured to transmit the M groups of subset channel audio data to the M subset channel audio receiving devices in parallel through the M transmission modules. Each of the transmission modules adopts a different transmitting frequency at the same time.

The baseband and protocol processing unit 42 is further configured to change the transmission modules used for transmitting each group of subset channel audio data according to a preset changing rule. Each transmission module comprises a radio frequency (RF) unit and an antenna. In one embodiment, each transmission module in FIG. 4 comprises a BLE radio frequency (RF) unit and an antenna connected with corresponding BLE RF unit.

In one embodiment, the audio processing and storage unit 41 is further configured to group the N channels of audio data into the M groups of subset channel audio data according to channel information of the audio data received by each subset channel audio receiving device, wherein one subset channel audio receiving device receives one group of subset channel audio data correspondingly.

In one embodiment, the preset changing rule comprises: each group of subset channel audio data is transmitted through the M transmission modules alternately.

In another embodiment, the preset changing rule comprises: when each group of subset channel audio data is repeatedly transmitted within one transmission time period, different transmission modules are used for transmission at least one time. When one group of subset channel audio data comprises at least two channels of audio data, the transmission module transmits the at least two channels of audio data serially in time division multiplexing mode. When the wireless multi-channel audio transmission method is used in the BLE audio communication, the baseband and protocol processing unit 42 is further configured to establish a group of connected isochronous stream CIS links with each subset channel audio receiving device respectively to transmit one group of subset channel audio data, wherein the group of CIS links comprises at least one CIS link and one CIS link is configured to transmit one channel of audio data; or establish a group of broadcast isochronous stream BIS links with each subset channel audio receiving device respectively to transmit one group of subset channel audio data, wherein the group of BIS links comprises at least one BIS, and one BIS link is configured to transmit one channel of audio data.

In one embodiment, the audio processing and storage unit 41 is configured to encode the N channels of audio data according to a Bluetooth low power communication protocol to generate N channels of mono audio data or audio service data units. The baseband and protocol processing unit 42 is configured to package the N channels of mono audio data or audio service data units into N channels of protocol data units respectively according to a CIS protocol or a BIS protocol, and group the N channels of protocol data units into the M groups of subset channel audio data according to channel information of the audio data received by each subset channel audio receiving device.

The M groups of subset channel audio data are respectively transmitted to corresponding subset channel audio receiving device through the M transmission modules in parallel. The audio processing and storage unit 41 may also be configured to collect and store multi-channel audio data and perform relevant audio processing. The baseband and protocol processing unit 42 is configured to transmit the M groups of subset channel audio data to the M BLE RF units. For one channel of protocol data units transmitted through the CIS link or the BIS link with a sequence number X, the BLE RF unit and the antenna with a sequence number R is used in a subevent with a sequence number S of an isochronous channel event with a sequence number E, wherein R=(X+E+S) mod M, R, X, E and S are all natural numbers. The BLE radio frequency unit modulates the input PDU into a radio frequency signal and sends the radio frequency signal to corresponding subset channel audio receiving device through the connected antenna.

Figure 2:
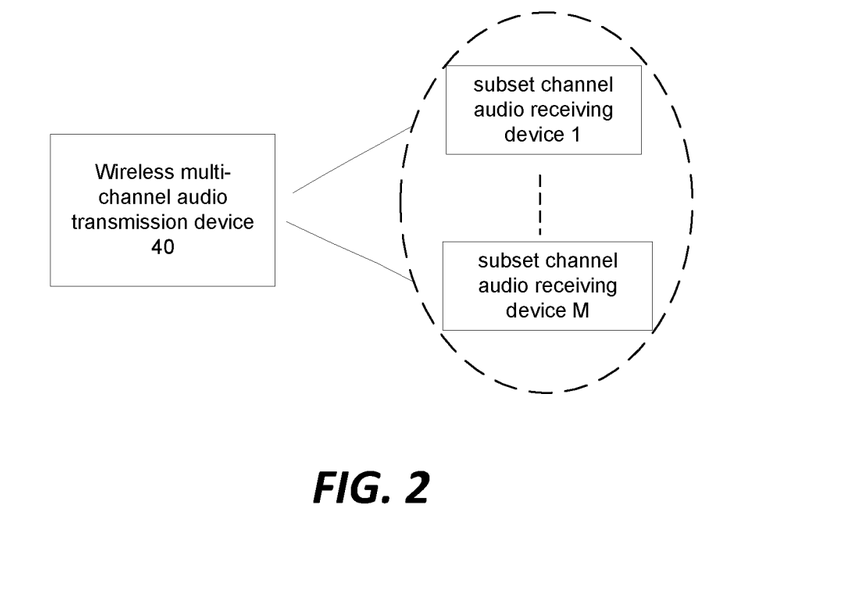
FIG. 2 is a schematic diagram of a wireless multi-channel audio transmission system according to one embodiment of the present invention.

FIG. 2 is a schematic diagram of a wireless multi-channel audio transmission system according to one embodiment of the present invention. Referring to FIG. 2, the wireless multi-channel audio transmission system comprises a wireless multi-channel audio transmission device and M subset channel audio receiving devices. The wireless multi-channel audio transmission device is configured to divide the N channels of audio data into M groups of subset channel audio data; and transmit the M groups of subset channel audio data to the M subset channel audio receiving devices in parallel according to the wireless multi-channel audio transmission method 100 shown in FIG. 3.

The M subset channel audio receiving devices are configured to receive the M groups of subset channel audio data from the wireless multichannel audio transmission device according to the wireless multi-channel audio transmission method 300 shown in FIG. 3. The subset channel audio receiving device m receives $K_m$ channels of audio data, ($N > K_m \geq 1$). That is, each subset channel audio receiving device receives at least one channel of audio data. The sum of the channels of all the subset channel audio receiving devices is equal to N, namely $\Sigma_{m=1}^{M} K_m = N$.

In one embodiment, each subset channel audio receiving device comprises at least one mono audio receiving device, and/or at least one multi-channel audio receiving device. Specifically, each subset channel audio receiving device may comprise at least one mono channel audio receiving device, may also comprise one multi-channel audio receiving device, and may also comprise a plurality of mono audio receiving devices and/or a plurality of multi-channel audio receiving devices.

Other technical details and working principles of the wireless multi-channel audio transmission system provided according to one embodiment of the present invention may be implemented with reference to the foregoing embodiments, which s are not described herein again. A working principle of the wireless multi-channel audio transmission method and system will be described by taking the BLE audio two-channel TWS (true wireless stereo) earphone pair as an example of the subset channel audio receiving device. In this example, when the TWS earphone pair is used as the subset channel audio receiving device, the wireless multi-channel audio transmission device can be a smart phone, a smart TV, a smart speaker or other audio transmission devices.

The TWS earphone pair comprises two subset channel audio receiving devices. Each subset channel audio receiving device is a mono audio receiving device, and corresponds to a left channel earphone or a right channel earphone. Each subset channel audio receiving device receives one channel corresponding to the left channel or the right channel. A CIS link or BIS link is established between the wireless multi-channel audio transmission device and one of the left and right channel earphones of the TWS earphone pair. Each CIS link or BIS link uses a different channel to ensure that the two CIS links or BIS links do not interfere with each other. An existing BLE channel selection algorithm of time-division multiplexing can be used to determine the channels of the CIS links or the BIS links to ensure sufficient frequency isolation.

Referring to FIG. 4, when M=2, the wireless multi-channel audio transmission device 40 comprises two BLE radio frequency units and two antennas. The CIS or BIS link is established between the wireless multi-channel audio transmission device and one of the left channel earphone and the right channel earphone of the TWS earphone pair. The audio processing and storage unit 41 of the wireless multi-channel audio transmission device 40 collects, processes and saves the two-channel audio data, and adopts a low-complexity communication codec (LC3) according to the BLE Audio communication protocol to encode the two-channel audio data into two channels of mono audio data or audio service data packets (SDU), respectively. The baseband and protocol processing storage unit 42 saves and executes the BLE communication protocol, CIG or BIG protocol, and encapsulates the two channels of mono audio data or audio service data packets (SDU) into protocol data units (PDU) according to the CIS or BIS protocol, and transmits them to two different BLE RF units in parallel. The BLE radio frequency units modulate the corresponding PDUs into radio frequency signal and send it to the left channel earphone and the right channel earphone of the TWS earphone pair through corresponding antennas.

Figure 5A:
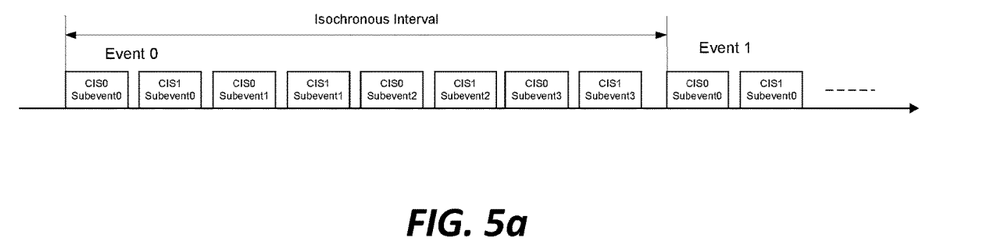
FIG. 5A is a schematic diagram of a CIG time slot structure of the wireless multi-channel audio system.
Figure 5B:
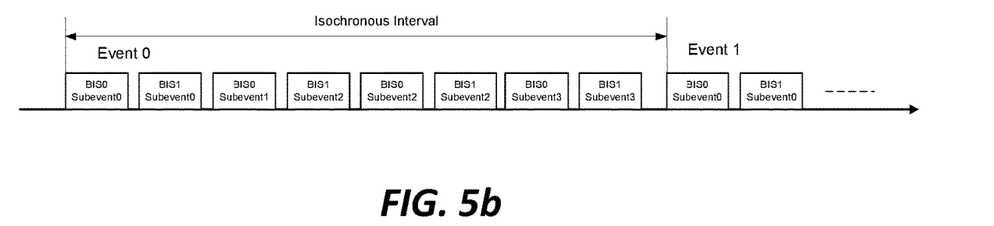
FIG. 5b is a schematic diagram of a BIG time slot structure of the wireless multi-channel audio system.

FIG. 5A is a schematic diagram of a CIG time slot structure of the wireless multi-channel audio system. FIG. 5b is a schematic diagram of a BIG time slot structure of the wireless multi-channel audio system. As shown in FIGS. 5a and 5b, it is the CIG or BIG time slot structure between the BLE Audio transmission device and the TWS earphone pair. The CIG established between the BLE Audio transmission device and the TWS earphone pair in FIG. 5a comprises two CIS links, i.e. CIS0 and CIS1. The BIG established between the BLE Audio transmission device and the TWS earphone pair in FIG. 5b comprises two BIS links, i.e. BIS0 and BIS1. In one isochronous interval, each CIS link or each BIS link contains 4 subevents, i.e. subevent 0, subevent 1, subevent 2 and subevent 3. The subevents of the CIS0 link and the CIS1 link are performed alternately in a time-division multiplexing manner. The subevents of the BIS0 link and the BIS1 link are performed alternately in a time-division multiplexing manner.

Figure 6A:
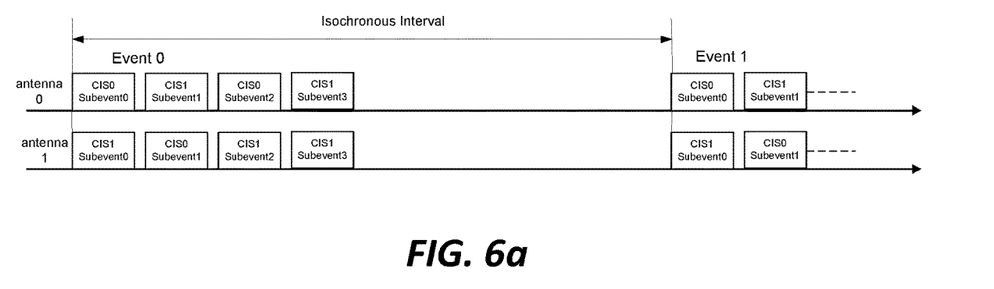
FIG. 6a is a schematic diagram of a CIG time slot structure of the wireless multi-channel audio system according to one embodiment of the present invention.
Figure 6B:
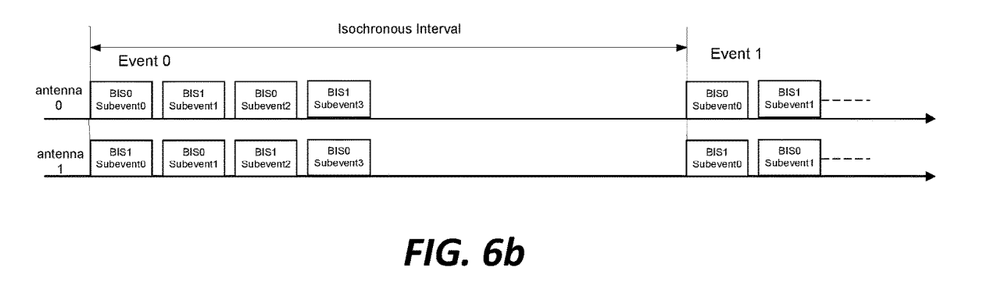
FIG. 6b is a schematic diagram of a BIG time slot structure of the wireless multi-channel audio system according to another embodiment of the present invention.

FIG. 6a is a schematic diagram of a CIG time slot structure of the wireless multi-channel audio system according to one embodiment of the present invention. FIG. 6b is a schematic diagram of a BIG time slot structure of the wireless multi-channel audio system according to another embodiment of the present invention. FIGS. 6a and 6b shows the CIG time slot structure and the BIG time slot structure between the wireless multi-channel audio transmission device and the TWS earphone pair respectively. The wireless multi-channel audio transmission device is connected with the TWS earphone pair through the CIG or the BIG. The CIG in FIG. 6a comprises two CIS links, i.e. CIS0 and CIS1. The BIG in FIG. 6b comprises two BIS links, i.e. BIS0 and BIS1. In one equal time interval, each CIS link or each BIS link comprises 4 subevents, i.e. subevent 0, subevent 1, subevent 2 and subevent 3. The subevents of the CIS0 link and the CIS1 link are performed in parallel and alternately through two different channels, two different BLE RF units and two different antennas. The subevents of the BIS0 link and the BIS1 link are performed in parallel and alternately through two different channels, two different BLE RF units and two different antennas.

As shown in FIGS. 6a and 6b, a subevent 0 of an event 0 of the CIS0 link is performed by the BLE RF unit 0 and the antenna 0, a subevent 0 of an event 0 of the CIS1 link is performed by the BLE RF unit 1 and the antenna 1, a subevent 1 of the event 0 of the CIS0 link is performed by the BLE RF unit 1 and the antenna 1, and a subevent 1 of the event 0 of the CIS0 link is performed by the BLE RF unit 0 and the antenna 0. Compared with a time division multiplexing method shown in FIGS. 5a and 5b, the method shown in FIGS. 6a and 6b can improve the reliability of wireless transmission through the spatial diversity obtained by two antennas, and reduce the transmission delay by half through frequency division multiplexing, or, perform more subevents, that is, more retransmissions, in more times within one isochronous interval, thereby improving wireless transmission performance or wireless transmission reliability. For example, a wireless multi-channel 5.1 surround sound audio system is used as an example to describe the working principle of the wireless multi-channel audio system. The wireless multi-channel audio transmission device of the wireless multi-channel audio system is a smart TV or smart main speaker, and the subset channel audio receiving devices of the wireless multi-channel audio system are BLE Audio wireless speakers.

In the wireless multi-channel 5.1 surround sound audio system, there are 6-channel speakers in total. A center speaker (Center) and a subwoofer are usually smart TVs or smart main speakers, and the other 4-channel speakers are BLE audio wireless speakers, including a front left speaker, a front right speaker, a left surround speaker and a right surround speaker. If the existing time-division multiplexing BLE Audio technology is used, a CIG including four CIS links needs to be established between the smart TV or smart main speaker and the BLE Audio wireless speakers. LC3 encoding is adopted for audio. An encoding rate of each channel is 96 kbps, an encoding frame length is 10 ms, a size of an audio service data unit SDU is 120 bytes, and the isochronous interval is 10 ms. Using BLE 2 Mbps transmission rate, an air time occupied by an encrypted audio protocol data unit (PDU) is 540 us, an Inter Frame Space (T_IFS) is 150 us, an air time occupied by an acknowledgment packet (ACK) is 44 us, and a Minimum Subevent Space (T_MSS) is 150 us. Therefore, the time occupied by each subevent is 884 us (540+150+44+150). In order to ensure the basic reliability of wireless transmission, each CIS link needs to contain at least three sub-events. Then, 4 CIS links require a total of 12 sub-events, that is, 10.608 ms, which exceeds the maximum time that the isochronous interval (10 ms) can provide. Therefore, the existing time-division multiplexing BLE Audio technology cannot solve the above-mentioned requirements of the wireless multi-channel 5.1 surround sound audio system.

In the present invention, the wireless multi-channel audio transmission device of the 5.1 surround sound audio system can use 4 BLE radio frequency units and 4 antennas. The 5.1 surround sound audio system comprise 4 subset channel audio receiving devices each comprising one mono audio receiving device, namely, the left front speaker, the right front speaker, the left surround speaker and the right surround speaker. A CIG is created between the wireless multi-channel audio transmission device and the 4 subset channel audio receiving devices. The CIG is divided into four CIG subsets. Each CIG subset contains one CIS link. Each CIS link connects one of the 4 subset channel audio receiving devices, namely, the left front speaker, the right front speaker, the left surround speaker and the right surround speaker.

Figure 7:
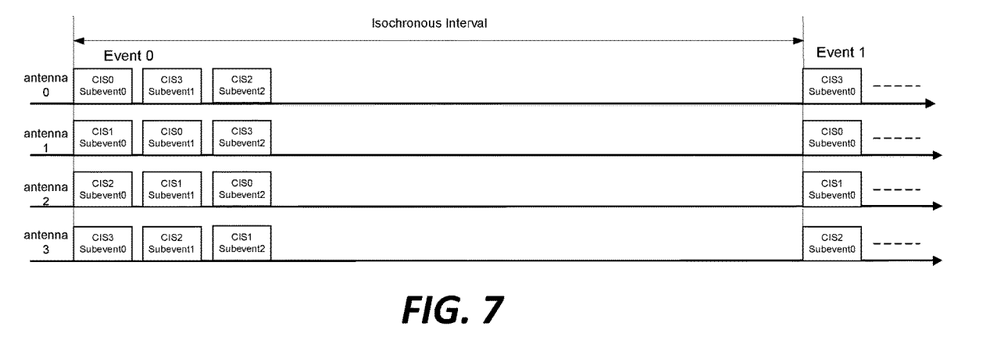
FIG. 7 is a schematic diagram of a CIG time slot structure of the wireless multi-channel audio system according to one embodiment of the present invention.

FIG. 7 shows a CIG time slot structure of the wireless multi-channel 5.1 surround sound audio system with 4 BLE radio frequency units and 4 antennas. As the sequence numbers of events and subevents are updated, each CIS link alternately uses different BLE radio units and antennas for data transmission. In this way, the frequency division multiplexing and the spatial diversity are used to meet the needs of each CIS link having at least three sub events within the isochronous interval of 10 ms, and the reliability of wireless transmission can be improved through spatial diversity. Each CIS link can also support more subevents to further improve the reliability of wireless transmission. However, the 4 BLE radio frequency units and the 4 antennas are required in this example, and the complexity of the wireless multi-channel audio transmission device is high.

In order to reduce the complexity of the above wireless multi-channel audio transmission device, the wireless multi-channel audio transmission device in the wireless multi-channel audio system may also combine time division multiplexing and frequency division multiplexing. For example, the wireless multi-channel audio transmission device uses 2 BLE radio frequency units and 2 antennas, and the wireless multi-channel audio system includes two subset channel audio receiving devices. Each of the subset channel audio receiving devices includes two mono audio receiving devices, and receives two channels of audio data. The left front speaker and the right front speaker are regarded as one subset channel audio receiving device. A group of connected isochronous stream CIS links is established between the wireless multi-channel audio transmission device and the one subset channel audio receiving device. The group of connected isochronous stream CIS links includes a CIS0 link connecting the left front speaker and a CIS2 link connecting the right front speaker. CIS0 and CIS2 form a subset CIG. Similarly, the left surround speaker and right surround speaker are regarded as another subset channel audio receiving device. Another group of CIS links is established between the wireless multi-channel audio transmission device and the another subset channel audio receiving device. The another group of CIS links includes a CIS1 link connecting the left surround speaker and a CIS3 link connecting the right surround speaker. CIS1 and CIS3 form another subset CIG. In this way, each CIS needs 3 subevents in one isochronous interval, and the two time-division multiplexed CISs need a total of 6 subevents on each BLE radio unit and each antenna, that is, 5.304 ms, which can meet the demand. Moreover, each CIS can also support more subevents, that is, more retransmission times, so as to further improve the reliability of wireless transmission.

Figure 8:
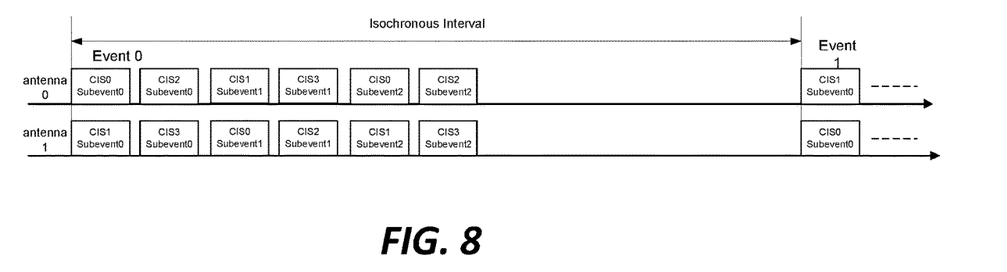
FIG. 8 is a schematic diagram of a CIG time slot structure of the wireless multi-channel audio system according to another embodiment of the present invention.

FIG. 8 shows a CIG time slot structure of the wireless multi-channel 5.1 surround sound audio system with 2 BLE radio frequency units and 2 antennas. A CIG is created between the wireless multi-channel audio transmission device and the 4 subset channel audio receiving devices. The CIG is divided into two subset CIGs, and each subset CIG contains two CIS links. The CIS0 link and the CIS2 link form one subset CIG, and the CIS1 link and the CIS3 link form another subset CIG. In one isochronous interval, each CIS link contains 3 subevents, i.e., subevent 0, subevent 1 and subevent 2.

The subevent 0 of the event 0 of the CIS0 link and the sub-event 0 of the event 0 of the CIS2 link are executed in a time-division multiplexing manner through the BLE radio unit 0 and the antenna 0. The subevent 0 of the event 0 of the CIS1 link and the subevent 0 of the event 0 of the CIS3 link are executed in the time-division multiplexing manner through the BLE radio unit 1 and the antenna 1. The subevent 1 of the event 0 of the CIS0 link and the sub-event 1 of the event 0 of the CIS2 link are executed in a time-division multiplexing manner through the BLE radio unit 1 and the antenna 1. The subevent 1 of the event 0 of the CIS1 link and the subevent 1 of the event 0 of the CIS3 link are executed in the time-division multiplexing manner through the BLE radio unit 0 and the antenna 0. The subset CIG formed by the CIS1 link and the CIS3 link and the subset CIG formed by the CIS0 link and the CIS2 link are alternately executed by different radio frequency units and different antennas through frequency division multiplexing. Through time division multiplexing and frequency division multiplexing, the complexity of wireless multi-channel audio transmission device can be appropriately increased, and the retransmission times requirements of wireless multi-channel 5.1 surround sound audio transmission can also be met within the isochronous interval. The reliability of wireless transmission can be improved through spatial diversity.

Figure 9:
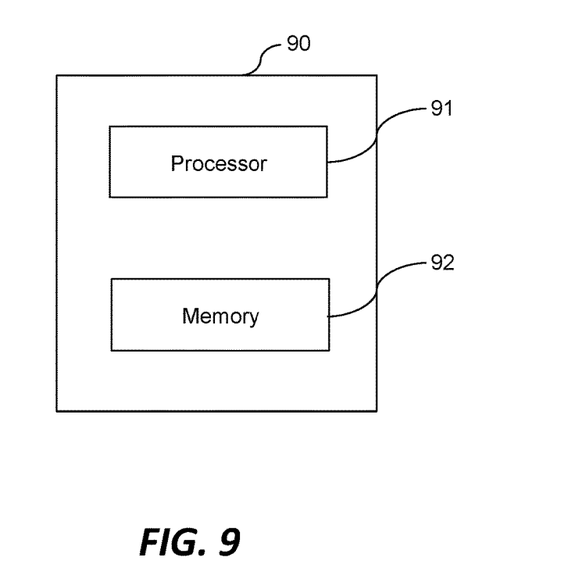
FIG. 9 is a schematic structural diagram of an electronic device according to one embodiment of the present invention.

Referring to FIG. 9, an electronic device 90 is provided according to one embodiment of the present invention. The electronic device 90 comprises a processor 91, a memory 92, and a computer program stored in the memory 92 and running on the processor 91. When executed by the processor 91, the computer program realizes the above described wireless multi-channel audio transmission method 100, or 300.

An embodiment of the present invention further provides a computer-readable storage medium, where a computer program is stored on the computer-readable storage medium, and when the computer program is executed by a processor, each process of the above-mentioned embodiment of the wireless multi-channel audio transmission method is implemented, and can achieve the same technical effect, in order to avoid repetition, it is not repeated here. The computer-readable storage medium is, for example, a read-only memory (Read-Only Memory, ROM), a random access memory (Random Access Memory, RAM), a magnetic disk, or an optical disk.

A computer-readable storage medium storing a program executed by a processor is provided according to one embodiment of the present invention. The program is executed by the processor to cause the processor to perform the above-mentioned audio data forwarding method. In order to avoid repetition, details are not repeated here. The computer-readable storage medium can be, for example, read only memory (ROM), random access memory (RAM), magnetic disc or optical disc.

Those skilled in the art should be aware that the embodiments of this application may be methods, systems, or computer program products. Accordingly, the present invention may take the form of a complete hardware embodiment, a complete software embodiment, or an embodiment in conjunction with software and hardware aspects. Furthermore, the present invention may take the form of a computer program product implemented on one or more computer-available storage media (comprising, but not limited to, disk memory, CD-ROM, optical memory, etc.) containing computer-available program code.

The present invention is described with reference to methods, equipment (systems), and flow charts and/or block diagrams of computer program products according to the embodiment of the present invention. It should be understood that each flow and/or block in a flowchart and/or block diagram, as well as the combination of flow and/or block in a flowchart and/or block diagram, can be implemented by computer program instructions. These computer program instructions may be provided to a processor of a general purpose computer, a dedicated computer, an embedded processor, or other programmable data processing device to produce a machine such that instructions executed by a processor of a computer or other programmable data processing device produce instructions for implementing a flow chart or more. A device for processes and/or block diagrams or functions specified in a box or multiple boxes.

These computer program instructions may also be stored in a computer-readable memory that may guide a computer or other programmable data processing device to work in a particular way, such that the instructions stored in the computer-readable memory generate a manufacturer comprising an instruction device that is implemented in a flow chart one or more processes. Process and/or block diagram, a box or function specified in multiple boxes. These computer program instructions may also be loaded on a computer or other programmable data processing device such that a series of operational steps are performed on a computer or other programmable device to produce computer-implemented processing, thereby providing instructions executed on a computer or other programmable device for implementing a flow chart. The steps of a process or multiple processes and/or block diagrams, or functions specified in a box.

Although preferred embodiments of the present invention have been described, additional changes and modifications to these embodiments may be made once the basic creative concepts are known to those skilled in the art. The appended claims are therefore intended to be interpreted to comprise preferred embodiments and all changes and modifications falling within the scope of this application. Obviously, a person skilled in the art may make various changes and variations to the application without departing from the spirit and scope of the application. Thus, if these modifications and variations of this application fall within the scope of the claims and their equivalent technologies, the application is also intended to comprise these changes and variations.

I claim:

1. A wireless multi-channel audio transmission method for transmitting N channels of audio data to M subset channel audio receiving devices, comprising:

dividing the N channels of audio data into M groups of subset channel audio data, wherein each of the M groups of subset channel audio data comprises at least one of the N channels of audio data; and transmitting the M groups of subset channel audio data respectively to M subset channel audio receiving devices through M transmission modules in parallel, wherein the M transmission modules adopt different transmitting frequencies, and the M transmission modules are changed according to a preset changing rule, wherein M and N are positive integers, and M≥2, N≥2, wherein when the wireless multi-channel audio transmission method is used for Bluetooth Low Energy communication, the method further comprises:

establishing one group of CIS links with each subset channel audio receiving device respectively to transmit one group of subset channel audio data, wherein the one group of CIS links comprises at least one CIS link, and one CIS link is configured to transmit one channel of audio data; or establishing one group of BIS links with each subset channel audio receiving device respectively to transmit one group of subset channel audio data, wherein the one group of BIS links comprises at least one BIS link, and one BIS link is configured to transmit one channel of audio data.

2. The wireless multi-channel audio transmission method according to claim 1, wherein said dividing the N channels of audio data into M groups of subset channel audio data comprises:

grouping the N channels of audio data into the M groups of subset channel audio data according to channel information of the audio data received by each of the M subset channel audio receiving devices, wherein one subset channel audio receiving device receives one corresponding group of subset channel audio data.

3. The wireless multi-channel audio transmission method according to claim 1, wherein the preset changing rule comprises: each group of subset channel audio data transmitted through the M transmission modules alternately.

4. The wireless multi-channel audio transmission method according to claim 1, wherein the preset changing rule comprises: when each group of subset channel audio data is repeatedly transmitted within one transmission time period, different transmission modules are used for transmission at least one time.

5. The wireless multi-channel audio transmission method according to claim 1, wherein when one group of subset channel audio data comprises at least two channels of audio data, the transmission module transmits the at least two channels of audio data serially in a time division multiplexing mode.

6. The wireless multi-channel audio transmission method according to claim 1, wherein the dividing the N channels of audio data into M groups of subset channel audio data comprises:

encoding the N channels of audio data, and packaging them into N channels of protocol data units respectively according to a CIS protocol or a BIS protocol; and grouping the N channels of protocol data units into the M groups of subset channel audio data according to channel information of the audio data received by each subset channel audio receiving device.

7. The wireless multi-channel audio transmission method according to claim 6, wherein each transmission module comprises a BLE radio frequency unit and an antenna; the transmitting the M groups of subset channel audio data to the M subset channel audio receiving devices through M transmission modules in parallel comprise:

the M groups of subset channel audio data are respectively transmitted to corresponding subset channel audio receiving devices through the M transmission modules in parallel, wherein for one channel of protocol data units transmitted through the CIS link or the BIS link with a sequence number X, the BLE RF unit and the antenna with a sequence number R is used in a subevent with a sequence number S of an isochronous channel event with a sequence number E, wherein R=(X+E+S) mod M, R, X, E and S are all natural numbers.

8. A wireless multi-channel audio transmission device for transmitting N channels of audio data to M subset channel audio receiving devices, comprising:

an audio processing and storage unit configured for dividing the N channels of audio data into M groups of subset channel audio data, wherein each group of subset channel audio data comprises at least one channel of audio data; and a baseband and protocol processing unit configured for transmitting the M groups of subset channel audio data to the M subset channel audio receiving devices through M transmission modules in parallel, wherein each of the transmission modules adopts a different transmitting frequency at the same time, and the transmission modules used for transmitting each group of subset channel audio data are changed according to a preset changing rule, wherein M and N are positive integers, and M≥2, N≥2, wherein the baseband and protocol processing unit is further configured to establish a group of connected isochronous stream CIS links with each subset channel audio receiving device respectively to transmit a group of subset channel audio data, wherein the group of CIS links comprises at least one CIS link and one CIS link is configured to transmit one channel of audio data; or the baseband and protocol processing unit is further configured to establish a group of broadcast isochronous stream BIS links with each subset channel audio receiving device respectively to transmit a group of subset channel audio data, wherein the group of BIS links comprises at least one BIS link and each one BIS link is configured to transmit one channel of audio data.

9. The wireless multi-channel audio transmission device according to claim 8, wherein each transmission module comprises a BLE RF unit and an antenna.

10. The wireless multi-channel audio transmission device according to claim 8, wherein the audio processing and storage unit 41 is further configured to group the N channels of audio data into the M groups of subset channel audio data according to channel information of the audio data received by each subset channel audio receiving device, wherein one subset channel audio receiving device receives one group of subset channel audio data correspondingly.

11. The wireless multi-channel audio transmission device according to claim 8, wherein the preset changing rule comprises: each group of subset channel audio data is transmitted through the M transmission modules alternately.

12. The wireless multi-channel audio transmission device according to claim 8, wherein the preset changing rule comprises: when each group of subset channel audio data is repeatedly transmitted within one transmission time period, different transmission modules are used for transmission at least one time.

13. The wireless multi-channel audio transmission device according to claim 8, wherein when one group of subset channel audio data comprises at least two channels of audio data, the transmission module transmits the at least two channels of audio data serially in a time division multiplexing mode.

14. The wireless multi-channel audio transmission device according to claim 8, wherein the audio processing and storage unit is configured to encode the N channels of audio data according to a Bluetooth low power communication protocol to generate N channels of mono audio data or audio service data units, and the baseband and protocol processing unit is configured to package N channels of mono audio data or audio service data units into N channels of protocol data units respectively according to a CIS protocol or a BIS protocol, and group the N channels of protocol data units into M groups of subset channel audio data according to channel information of the audio data received by each subset channel audio receiving device.

* * * * *